June 1, 1971     T. S. AMES     3,582,376
QUICK-SETTING CEMENT COMPOSITION CONTAINING PORTLAND
CEMENT, ALPHA GYPSUM AND A DISPERSANT
Filed Sept. 9, 1968
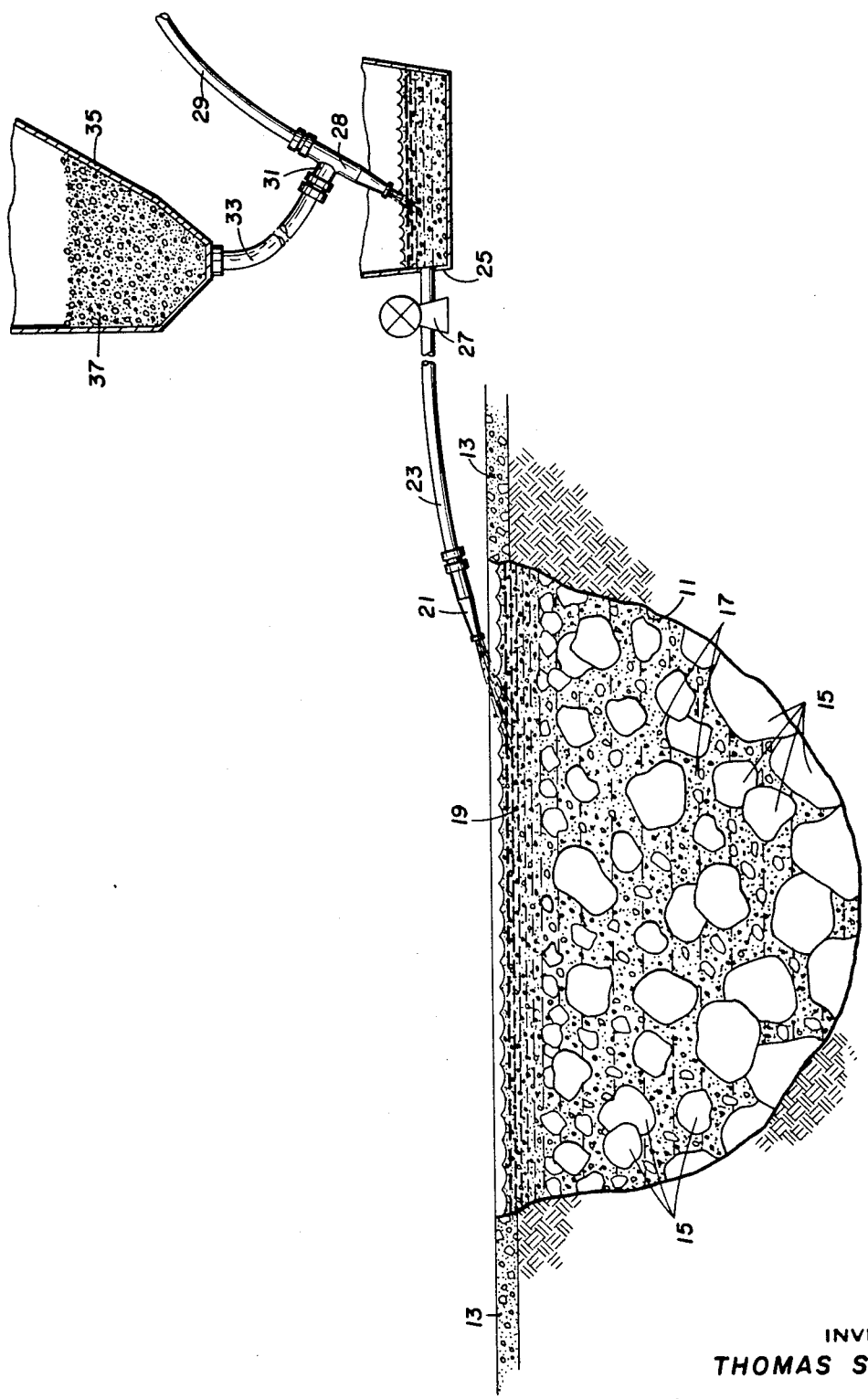
INVENTOR
THOMAS S. AMES
By: Richards, Harris & Hubbard
ATTORNEYS United States Patent Office 3,582,376
Patented June 1, 1971

3,582,376
QUICK-SETTING CEMENT COMPOSITION CONTAINING PORTLAND CEMENT, ALPHA GYPSUM AND A DISPERSANT
Thomas S. Ames, Brownwood, Tex., assignor to The Western Company of North America, Fort Worth, Tex.
Continuation-in-part of application Ser. No. 546,472, Apr. 15, 1966. This application Sept. 9, 1968, Ser. No. 767,893
Int. Cl. C04b 13/14
U.S. Cl. 106—90
8 Claims

ABSTRACT OF THE DISCLOSURE

Craters and earth voids are quickly filled with a high-strength, quick-setting cement composition comprising a mixture of cement material consisting essentially of from about 9.5 to about 4 parts by weight of calcium sulfate hemihydrate to about 0.5 to about 6 parts by weight of portland cement and water which is present in a quantity of from about 22% to about 70% by weight. According to the desired uses therefor, accelerators, retardants or disbursants are added to the mixture. The preferred quick-setting cement composition of this invention consists of from 9.5 to 7 parts by weight of alpha gypsum to 0.5 to 30 parts by weight of portland cement along with from about 22% to about 40% water by weight, based upon the cement material.

---

This application is a continuation-in-part of patent application Ser. No. 546,472 filed Apr. 15, 1966 now abandoned.

The present invention relates to a quick-setting cement composition and to a method of filling voids with such composition. The composition and method find particular utility in filling craters, for example, of the type caused by bombs. However, the method and composition have other uses, such as the consolidation of particulate matter such as soils which are quite loose and consequently are characterized by a relatively high percentage of voids.

In military operations, bombs or other missiles directed by the enemy onto a landing strip often damage a strip to the extent that aircraft cannot land or take off without of the extent that aircraft cannot land or takeoff without substantial repairs being first effected. While this always presents a problem, a particular emergency is present in those instances where aircraft from the damaged landing strip are airborne or where it is necessary to get aircraft airborne for purposes of defense or retaliation.

Apart from situations involving landing strips or other aircraft activity, in certain instances it is desired that soil with relatively poor load-bearing qualities be altered rapidly to bear a substantial load. Such soil is generally characterized by containing a substantial percentage of void regions. In such instances, it would indeed be desirable if the soil could be consolidated quickly to give it substantially enhanced load-bearing strength.

Consistent with solution of the foregoing mentioned problems, an object of the present invention is to rapidly fill craters and voids. Specifically, one object is to fill bomb craters in order to repair landing strips quickly and efficiently to provide load-bearing surface on the strip that will permit the landing and takeoff of aircraft in emergency situations. A further object is to provide a means to simply, yet effectively, consolidate particulate matter such as soils in order to give them materially increased load-bearing characteristics.

To meet the objects enumerated above, the present invention provides a method of filling a crater quickly, efficiently and effectively. This method comprises introducing into the crater a quick-setting cement. The cement comprises a mixture of a cement material and water. The cement material consists essentially of from about 9.5 to about 4 parts by weight of calcium sulfate hemihydrate to about 0.5 to about 6 parts of portland cement. Water is normally present in quantity of from about 22% to about 70%, based on the quantity of cement material in the mixture. Preferably, the mixture includes a minor proportion of a dispersant in order to make it more fluid and, hence, easy to handle, e.g., by conventional pumping equipment. The cement slurry under such conditions should possess an apparent viscosity ranging from about 10 centipoises to about 100 poises, as measured at 80° F.

While any well-known calcium sulfate hemihydrate ($CaSo4 \cdot \frac{1}{2} H_2O$), such as plaster of Paris, can be used in the practice of this invention, it is preferred that the calcium sulfate hemihydrate having the alpha form of crystal structure be utilized in this invention. This material is commonly called alpha gypsum. A typical method of producing alpha gypsum is disclosed in U.S. Pat. 1,901,051. Additionally, the most preferred cement material which can be utilized according to this invention consists of from 9.5 to 7 parts by weight of alpha gypsum to 0.5 to 3 parts by weight of portland cement to form a mixture which is admixed with from about 22% to 40% by weight water based upon the cement mixture.

In some instances, it is desired that a minor proportion of an accelerator be present in order to speed the setting of the composition. On the other hand, in other instances it is desired to retard setting somewhat and for this purpose a minor proportion of a retardant is provided. Furthermore, in very cold weather, it is desired to admix a minor portion of a mineral acid such as HCl to the mixing water to thereby accelerate the setting of the cement composition.

When a rather large crater is to be filled, one embodiment of the present invention contemplates that most of the crater will be initially filled with loose debris. Thereafter, a first portion of the quick-setting cement referred to above is introduced. This first portion preferably has a viscosity of no greater than about 100 centipoises in order that it may percolate well into the debris and consolidate it to produce a firm foundation. On top of this consolidated debris, a second portion of the quick-setting cement is introduced. Such second portion preferably is a thicker mixture, which sets to provide a cement with comparatively high load-bearing strength. It is characterized by having a viscosity no less than about 200 centipoises. The combination of the consolidated debris and the upper layer of quick-setting cement provides efficient filling for a bomb crater. A runway so repaired has sufficient compressive strength to permit the operation of landing aircraft thereon in a very short time after the initial crater damage has occurred. For example, with efficient work, repair of a large crater can be effected in the order of an hour's time and aircraft can be taken off or landed on the repaired runway within a short time thereafter.

According to another method of filling rather large craters, the crater will initially be filled with loose debris to about a foot from the top of the crater. The loose debris will then be lightly compacted, for example, to a California bearing ratio of about 3. Thereafter, the upper portion of the crater will be filled with a coarse grated gravel or a sand-gravel mixture. Next, the quick-setting cement referred to above is introduced onto the gravel, and percolates therethrough until the crater has been filled. The cement mixture utilized in this operation preferably consists of from about 9.5 to 4 and preferably from 9.5 to 7 parts by weight of calcium sulfate hemihydrate (preferably alpha gypsum) to about 0.5 to 6, preferably 0.5 to 3, parts by weight of portland cement. Water is present in quantity from about 35% to 70% based on the weight of the cement material. Additionally, the mixture has an apparent viscosity of no greater than about 250 centipoises, measured at 80° F. This method results in a layer of concrete on the top of the crater. It is to be understood that this method includes the process of laying concrete slabs for purposes other than filling bomb craters, for example, laying foundations, sidewalls, and roadways.

The present invention also provides a method of consolidating soils having voids. This method comprises introducing onto the soil a mixture of cement material and water. The cement mixture comprises from about 9.5 to 4 parts by weight of calcium sulfate hemihydrate to about 0.5 to 6 parts of portland cement. Water is present in quantity of from about 50% to 70%, based on the weight of the cement material. The mixture has an apparent viscosity of no greater than about 200 centipoises, measured at 80° F. Such mixture is permitted to remain in contact with the soil to percolate into the voids. In a short time, the soil is consolidated to provide firm, load-bearing soil structure.

In addition to the foregoing, the present invention provides a quick-setting cement of the character described above having utility for the filling of craters and for soil consolidation.

For a more complete understanding of the present invention and for further objects and advantages thereof, reference may now be had to the following description taken in conjunction with the acompanying drawing in which the single figure illustrates practice of the present invention to fill a bomb crater in an aircraft runway.

Referring to the figure in more detail, a bomb crater is illustrated at 11. In formation of this crater, a large portion of concrete landing pad 13 was blasted out. Moreover, the crater extends into the subsurface soil structure for a substantial distance. For example, the crater at its widest point of diameter, the top, may be of a diameter of 70 feet and have a depth of from 10 to 15 feet.

The situation in the figure is illustrated at a point in time where the process of the present invention has almost completed its repair. The largest volume of the crater has been filled with debris 15. This debris may be chunks of cement from the runway which were fragmented as a result of the bombing, rocks, dirt, or any other convenient objects or material which may be placed in the crater. The debris is consolidated to give it continuity and a high degree of subsurface load-bearing strength by a matrix of low viscosity quick-setting cement in accordance with the present invention. Over the debris 15, set in the cement matrix 17, an upper layer 19 of comparatively high viscosity quick-setting cement in accordance with the present invention is illustrated. As viewed in the figure, the introduction of this upper layer has almost been completed.

The figure illustrates a preferred practice of the present invention. The quick-setting cement is discharged into the crater by means of a nozzle 21. Nozzle 21 connects to conduit 23, which has quick-setting cement delivered to it from container 25 by means of conventional pump 27. Quick-setting cement is provided for container 25 from jet mixing nozzle 28 which discharges into container 25. Jet mixing nozzle 28 contains a conventional venturi on its inner regions (not illustrated). Water is flowed through the venturi of the nozzle via water supply line 29. A tube 31 enters the structure of nozzle 28 at a point with relation to the venturi within the nozzle such that a vacuum or low pressure region prevails. The low pressure region causes an aspirator or sucking action on tube 31. Conduit 33 leads downward from supply bin 35, which is located above nozzle 28. Supply bin 35 contains a mixture of cement material 37, which is drawn into jet nozzle 28 by the aspirator actions described, in combination with the force of gravity. By adjustment of flow rates by well-known means, for example, by valves, metering and/or restrictive devices, it will be apparent that the desired ratio of cement solids 37 to water may be obtained and that a well mixed water-solid slurry of desired composition may be discharged into tank 25.

In the course of processing illustrated in the figure, the quick-setting cement 17 introduced to percolate about and consolidate debris 15 has a lower viscosity than the upper layer or portion 19 of quick-setting cement which overlies the debris so consolidated. This is desirable in order that rapid percolation may fill a substantial part of the void regions in the debris. On the other hand, the thinner material is not usually the most desirable mixture for the upper layer overlying the debris. This is because the thinner material normally possesses lower mechanical strength qualities, for example, compression strength. However, in some cases, it is possible to use the same viscosity slurry for the upper layer as is used for consolidation purposes.

The present invention is also applicable to consolidation of loose soils, i.e., soils which have poor load-bearing characteristics. In such instances, there are a certain amount of voids present which will lower the strength characteristics of the soil. Such soil may be consolidated by introducing a quantity of comparatively thin (low viscosity) quick-setting cement in accordance with the present invention onto the soil surface. This quantity of quick-setting cement is allowed to percolate into the void regions, and in a relatively short period of time, percolation is complete to a substantial depth and the cement sets or cures to produce a consolidated soil having much greater load-bearing characteristics than originally was the case. This general technique can also be used to produce concrete by introducing a quantity of the comparatively thin (low viscosity) quick-setting cement onto a bed of gravel, or a gravel-sand mixture. The cement will percolate into the void regions throughout the length of the bed and cure to produce a concrete slab. No figure is presented to specifically illustrate this technique since it is quite analogous to the consolidation of debris 15, described in connection with the figure. It will be appreciated, however, that it may be desirable to remove a small amount of topsoil in order to provide a shallow recess or hole in which to introduce a quantity of quickly-setting cement to provide for hold-up time of the cement to keep it in contact for an adequate period of time to permit deep percolation. The upper region of such a hole or recess may ultimately be filled with a thicker and stronger cement, if desired.

While plaster of Paris cements are generally well known for their flash-setting ability, the use of 100% gypsum cement with corresponding quantities of water yield non-uniform set times which will vary as much as 50 minutes or more for different batches. Additionally, cured gypsum cements are relatively soft materials which deteriorate readily in the presence of water. On the other hand, portland cements are generally not self leveling and are known for their relatively long curing times (several hours). However, the cured portland cements are generally quite water resistant. Therefore, it is quite surprising that the quick-setting cement mixtures of this invention containing a major protion of gypsum and a minor portion of the portland cement would exhibit very short but stabilized setting times, the ability to percolate through particulate material before setting, high compressive strength and ruggedness, and an excellent resistance to water and adverse weather conditions.

The following examples are offered merely by way of illustration of how the present invention might be practiced, and it is not intended that they be taken as limiting its scope.

EXAMPLE 1

A crater of the nature illustrated in the figure and described in the discussion pertaining thereto is filled to about one foot from its top with chunks of concrete, rocks and dirt. This material is pushed into the crater with a bulldozer. After partial filling of the crater with debris, a relatively thin slurry of the quick-setting cement of the present invention is introduced into the crater by means of the nozzle and associated apparatus described in connection with the figure.

The quick-setting cement slurry so introduced has the following composition of cement material: eighty parts of plaster of Paris (as prepared by dehydration of gypsum) to twenty parts of conventional portland cement, both taken by weight. In addition, one part by weight, based on the total weights of the cement materials, of "Lomar D" (the condensed sodium salt of sulfonated naphthalene formaldehyde) is provided as dispersant. Water in amount of 60% by weight, based on the total amount of cement materials (the plaster of Paris plus the portland cement) is also provided. The resulting slurry of water and cement has a viscosity of about 30 centipoises. The flow of water is so adjusted that the proportion of the solids to water is maintained at the approximate quantity ratio enumerated just above.

The crater referred to is filled to a point flush with the upper runway surface. In this example, the same cement mixture or slurry is utilized for consolidating debris as is utilized for the upper layer overlying the debris.

The filling of the crater is accomplished in about one hour. After the lapse of an additional one-half hour, it is found that the upper surface of the filled crater now representing the top surface of the repaired runway portion has set to provide a firm and smooth load-bearing surface. This surface is observed to have a compressive load-bearing capacity well in excess of 500 lb./in.$^2$ (ASTM C-39-61).

EXAMPLE 2

Example 1 is repeated, except the quick-setting cement slurry therein utilized is varied after a sufficient quantity has been introduced to consolidate the debris in the crater, On the completion of such consolidation, the flow is varied through nozzle 28 by adjustment of conventional valve, measuring or other metering means to cause the slurry discharged into tank 25 to be 50% water, based on the total cement material (plaster of Paris plus portland cement). Note that the ratio of plaster of Paris to portland cement is maintained the same as was the case in Example 1, i.e., 8:2 parts by weight. Dispersant, in the same quantity as utilized in Example 1, based on the total cement material, is provided for the upper layer. The viscosity of the cement slurry is about 95 centipoises.

Disposition of the upper layer of quick-setting cement slurry is completed when it becomes flush with the surface of the damaged runway. The surface is smoothed over and the quick-setting cement is allowed to dry for approximately one-half hour. At the end of this time, it is observed that the upper surface of the repaired portion of the runway has a compressive load-bearing capacity in excess of 1000 lb./in.$^2$ (ASTM C-39-61).

EXAMPLE 3

A set of tests are run on varied mixtures of plaster of Paris, portland cement and water. No dispersant, accelerator, or retardant are used. The set time (as determined by the Vicat method) is determined and compressive strength tests are run on specimens thirty minutes after pouring. The following table presents the results:

TABLE I

| Plaster of paris [1] | Portland cement [1] | Water [1] | Set time (min.) | Compressive strength [2] |
|---|---|---|---|---|
| 100 | 0 | 70 | 8 | 850 |
| 90 | 10 | 68 | 3 | 1,300 |
| 80 | 20 | 65 | 3 | 1,250 |
| 70 | 30 | 63 | 3 | 1,000 |
| 60 | 40 | 60 | 3 | 800 |
| 50 | 50 | 58 | 3 | 525 |

[1] Percent by weight based on total cement materials, i.e., plaster of paris plus portland cement.
[2] Pounds per square inch, after thirty minutes from pouring (ASTM C-39-61).

EXAMPLE 4

In some instances, it is desired that the setting time be accelerated. This can be of particular value if a great emergency exists.

A water solution in quantity of 65 parts of a 5% by weight solution of potassium sulfate (based on the total quantity of cement solids) is introduced into and mixed with 100 parts of cement material. The cement material consists of a mixture of 80 parts by weight of plaster of Paris and 20 parts by weight of portland cement. It is observed that the resulting slurry sets within one minute (Vicat test method). After thirty minutes, a compressive strength of 550 lb./in.$^2$ (ASTM C-39-61) is observed.

EXAMPLE 5

Tests are conducting using "Lomar D" (condensed sodium salt of sulfonated naphthalene formaldehyde) as a dispersant. In these tests, a mixture of plaster of Paris to portland cement with a ratio of 8:2, by weight, is utilized as the cement material. In some instances, a retardant (calcium ligno sulfonate) is included in the mixture to prolong setting time. The following table presents the cement slurries in accordance with these tests, and gives set time and compressive strength of a specimen after thirty minutes from pouring:

TABLE II

| Plaster of paris | Portland cement [1] | Dispersant [1] | Retardant [1] | Water [1] | Set time [2] | Compressive strength [3] |
|---|---|---|---|---|---|---|
| 80 | 20 | 1.0 | 0 | 50 | 4 | 1,325 |
| 80 | 20 | 1.0 | .1 | 50 | 7 | 1,150 |
| 80 | 20 | 1.0 | .2 | 60 | 11 | 925 |
| 80 | 20 | 1.0 | .3 | 50 | 16 | 900 |
| 80 | 20 | 1.0 | .2 | 45 | 10 | 1,600 |
| 80 | 20 | 1.5 | .2 | 40 | 10 | 2,250 |

[1] Percent by weight based on total cement materials.
[2] Time in minutes.
[3] P.s.i. after 30 minutes from pouring (ASTM C-39-61).

EXAMPLE 6

The foregoing example is extended to test an additional slurry. The cement material for such test is six parts of plaster of Paris, two parts of portland cement, and two parts of silicon dioxide (all by weight). The following table presents the result:

TABLE III

| | |
|---|---|
| Plaster of Paris [1] | 60 |
| Portland cement [1] | 20 |
| SiO$_2$ | 20 |
| Dispersant [1] | 1 |
| Retardant [1] | .1 |
| Water [1] | 40 |
| Set time [2] | 6 |
| Compressive strength [3] | 1325 |

[1] Percent by weight based on total cement materials.
[2] Time in minutes.
[3] P.s.i. after 30 minutes from pouring (ASTM C-39-61).

EXAMPLE 7

Viscosities are determined for a series of five different water concentration slurries of the quick-setting cement utilized in the present invention. In each instance, eight parts by weight of plaster of Paris to two parts of portland cement are mixed to provide the cement material. One percent by weight of "Lomar D" (based on total cement material) is admixed as a dispersant. The results are as follows:

TABLE IV

Weight percent water:[1]     Apparent viscosity (cps.)

| | |
|---|---|
| 45 | 223 |
| 50 | 95 |
| 60 | 29 |
| 65 | 24 |
| 70 | 18 |

[1] Based on cement material.

The foregoing apparent viscosities are measured at 80° F. on a Fann VG meter.

EXAMPLE 8

A mixture of clay and gravel in approximately equal weight quantities is screened to obtain particles between 4 millimeters and 2.38 millimeters. The resulting particles are used as fill for a crater in the soil. Thereafter a cement material, 80% by weight plaster of Paris and 20% by weight portland cement is prepared. This material also has mixed with it 1% (based on the total cement material) of "Lomar D" dispersant. Water, in weight quantity of 70%, based on the cement material, is mixed with the cement material to form a slurry. The apparatus illustrated and discussed in connection with the figure is used for such mixing. The resulting slurry is pumped through a flexible conduit and discharged to overlie the fill. The slurry penetrates the clay-gravel fill to a depth of two to four inches and within a matter of less than one-half hour the slurry sets. The compressive strength of the fill increased several fold as a result of this consolidation process.

From the foregoing examples, it was observed that a dispersant is desirable in instances where a low water content slurry is desired. Without a dispersant, it is difficult to pump a slurry having less than 60% water content (based on total weight of cement solid materials involved). The preferred dispersant is the condensed sodium salt of sulfonated naphthalene formaldehyde, but other common dispersants may be used, e.g., ligno sulfonates, gluconic acid, and the solution salt of condensed naphthalene sulfonic acid.

However, it must be noted that the cement slurries of this invention consisting of alpha gypsum in admixture with the portland cement and having at least about a 28% water content (based on the total weight of the cement solid materials involved) can be easily pumped without a dispersant.

As is seen from the foregoing examples, setting time is shortened by use of an accelerator and lengthened by use of a retardant. Exemplary of accelerators are potassium sulfate, calcium chloride, sodium chloride, and sodium hydroxide. Exemplary of retardants are calcium ligno sulfonate, glucose, sucrose, and borax.

Other materials, which are essentially inert, may be used as a minor proportion of the cement solid mix in certain instances. For an illustration, see Example 6 involving silicon dioxide.

The following examples will illustrate the more preferred quick-setting cement compositions of this invention which comprise from 9.5 to 7 parts by weight of alpha gypsum to 0.5 to 3 parts by weight of portland cement admixed with from about 22% to 40% by weight water based on the weight of the dry cement blend. This composition possesses controlled and highly predictable setting times, high strength and excellent weather resistance.

EXAMPLE 9

A series of tests were run using varied amounts of water, alpha gypsum and portland cement with 0.25 weight percent of a dispersant (a condensed sodium salt of sulfonated naphthalene formaldehyde). The alpha gypsum utilized is a commercial gypsum sold under the trademark "Hydrostone." The set times (as determined by the Vicat method) and compressive and flexural strength tests were run on various specimens.

TABLE V

| $H_2O$,[1] percent | Set time (mins.) | Average compressive strength [2] | Average flexural strength [3] |
|---|---|---|---|
| 28.3 | 14 | 4,000 | 900 |
| 30 | 20 | 3,825 | 912 |
| 35 | 35 | 2,458 | 696 |
| 27.4 | 15 | 4,720 | 816 |
| 30 | 21 | 3,533 | 840 |
| 35 | 31 | 2,208 | 614 |
| 27.4 | 14 | 3,600 | 936 |
| 30 | 20 | 3,400 | 804 |
| 35 | 32 | 2,311 | 624 |
| 27.4 | 15 | 3,516 | 768 |
| 30 | 21 | 3,341 | 720 |
| 35 | 31 | 1,945 | 528 |

[1] Percent by weight based on total cement materials.
[2] P.s.i. after 1 hour from pouring as determined by ASTM C-39-61.
[3] P.s.i. after 1 hour from pouring as determined by ASTM C-293-59.

In addition to the excellent compressive and flexural strengths exhibited by these compositions, it is noted that each particular cement-water slurry in Table V exhibited a substantially uniform and highly predictable set time. Identical cement-$H_2O$ slurries of this invention exhibit set time differences of no more than about ±20%.

In order to illustrate the set time stabilization of the cement composition of this invention, twelve different alpha gypsum-water mixes of identical composition were made, and the set time of each mix was recorded. Each mix consisted of 100 parts by weight alpha gypsum ("Hydrostone") and 32 parts by weight water. The results of these tests are given in Table VI below.

TABLE VI

Set-time variation of 100% alpha gypsum+32% water

| Mix No.: | Set time, min. |
|---|---|
| 1 | 9 |
| 2 | 11 |
| 3 | 11 |
| 4 | 10 |
| 5 | 15 |
| 6 | 12 |
| 7 | 20 |
| 8 | 17 |
| 9 | 25 |
| 10 | 19 |
| 11 | 45 |
| 12 | 60 |

As shown by the results of these tests, identical alpha gypsum-water mixtures exhibited set times ranging from 9 to 60 minutes. Thus, it is quite surprising that the addition of the small quantity of portland cement to the alpha gypsum would stabilize the set times as indicated above.

EXAMPLE 10

Percolation tests were conducted using varying amounts of water with a preferred cement composition of 9.5 parts by weight alpha gypsum ("Hydrostone"), 5 parts by weight portland cement, and approximately 0.5 part by weight of a dispersant (a condensed sodium salt of sulfonated naphthalene formaldehyde). These tests were conducted by pouring a neat slurry of this preferred cement composition containing the water content as illustrated in Table VII into a cylindrical cardboard mold (6 inches in diameter by 12 inches long) which was substantially filled with the particulate matter indicated in Table VII below.

TABLE VII.—DEPTH OF PENETRATION OF CEMENT SLURRIES INTO SANDS

| H₂O, wt. percent | Viscosity (cp.) | Particle size (mm.) | | | | | |
|---|---|---|---|---|---|---|---|
| | | −1.19 +.71 | −1.68 +1.19 | −4 +1.68 | −6 +4 | −12 +6 | Mixed gravel |
| | | Penetration (inches) | | | | | |
| 32 | 350 | .125 | .187 | .25 | .5 | 3 | 1.0 |
| 35 | 230 | .25 | .31 | .50 | 8.0 | 12 | 1.0 |
| 40 | 65 | .50 | 1.2 | 8.0 | +12.0 | +12 | 2.0 |
| 45 | 47 | 2.0 | 8.0 | 12.0 | +12.0 | +12 | +12.0 |
| 50 | 32 | 4.0 | +12.0 | +12.0 | +12.0 | +12 | +12.0 |

Corresponding field tests were conducted over loose sand, and it was found that penetrations of the cement slurry from 0.125 to 0.25 inch would support foot traffic, and penetrations from about 1.25 inches to 2 inches would support wheeled vehicles such as jeeps and light trucks. Thus, the results of the tests indicate that the cement composition together with at least about 32 weight percent water will sufficiently consolidate most loose sands and gravels to thereby support foot traffic. Additionally, the slurries containing from about 35% to 40% water will sufficiently consolidate most loose sands and gravels to support light vehicular traffic, and slurries containing from 45% to 50% or more water will sufficiently consolidate most loose sands and gravels to support heavier vehicular traffic.

EXAMPLE 11

A series of tests were run by establishing several simulated bomb craters in an asphalt aircraft runway. In these tests, simulated bomb craters of the nature illustrated in the figure and from about 20 to about 66 feet in diameter were initially back-filled with debris to about 10 to 12 inches from the runway surface, and the backfill was lightly compacted to a California Bearing Ratio of from about 3 to about 6. In runs 1–4 illustrated in Table VIII below a coarse graded gravel was placed in the top 8 to 11 inches of the hole flush with the runway surface. Next, a neat slurry (without sand or gravel) of a preferred cement of this invention of 9.5 parts by weight alpha gypsum ("Hydrostone"), 5 parts by weight portland cement, 0.5 part by weight of a dispersant (a condensed sodium salt of sulfonated naphthalene formaldehyde), and from 3 to 4 parts by weight water was pumped over the gravel at the rate of approximately 1,000 gallons per minute. The neat slurry percolated through the gravel, filled the void spaces therewithin, and leveled itself.

In run five of Table VIII, the gravel layer was omitted, and the neat slurry was pumped directly into the crater over the lightly compacted backfill.

Thirty minutes after the completion of the slurry pumping, the cement was set and sufficiently cured to support the weight of a 58,000 lb. simulated aircraft for 16 passes without failure. The results of these tests are shown in Table VIII below.

TABLE VIII

| Run | 1 | 2 | 3 | 4 | 5 |
|---|---|---|---|---|---|
| Approx. crater dia., ft | 20 | 20 | 41 | 39 | 66 |
| Soil CBR: Position avg | 3.2 | 4.1 | 4.5 | 6 | 3.9 |
| Filler: | | | | | |
| Material | Gravel | Gravel | Gravel | None | Gravel |
| Thickness, inches | 8 | 11 | 11 | | 11 |
| Slurry: | | | | | |
| Thickness, inches | 10 | 12 | 12 | 6½ | 12 |
| Density avg. (lb./gal.) | 14.44 | 14.82 | 14.55 | 14.21 | 14.22 |
| Slurry: Pumping time (min.-sec.) | 1–11 | 1–20 | 5–38 | 6–25 | 13–6 |

Thus, the tests illustrate that the fast-setting neat slurry of this invention not only adequately percolated through the gravel fill material, and leveled itself within the crater as it was pumped, but also exhibited superior compressive strength within thirty minutes after it was poured. Additionally, the repaired craters have exhibited excellent resistance to weatherability. After twelve months of exposure to the natural elements, these craters exhibited no damage.

EXAMPLE 12

Several tests were conducted to illustrate the use of the fast-setting cement composition of this invention as a road-repair material. These tests were conducted on busy metropolitan area streets which carry several hundred cars each day.

Test 1

A large crater which was approximately six inches deep and had a capacity of about three cubic yards was filled with the following concrete composition: 2700 lb. of a cement material consisting of alpha gypsum ("Hydrostone") and portland cement in a weight ratio of 95:5 and containing 0.5% of a dispersant (a condensed sodium salt of a sulfonated naphthalene formaldehyde); 2025 lb. of sand; 6075 lb. of crushed rock; and 970 lb. of water. The composition was admixed within a cement-mixing truck for four minutes and then poured into the three-cubic-yard crater. The street was open to traffic 25 minutes from the start of mixing.

Test 2

Two holes having an average diameter of about 3.5 feet and approximately 5 to 6 inches deep were filled with a concrete containing the alpha gysum-portland cement-dispersant mix of run 1 and sand, rock and water in the same proportions as the concrete mix of run 1. Again the street was opened to traffic within 25 minutes from the start of mixing.

Test 3

A hole having an average diameter of about 3.5 feet and approximately 5 to 6 inches deep was initially filled with crushed rock, and a slurry consisting of the alpha gypsum-portland cement-dispersant cement composition specified in run 1 and containing 35 weight percent water was pumped over the crushed rock. The slurry percolated through the crushed rock and leveled itself. Again, the street was opened to traffic within 25 minutes from the start of mixing.

Test 4

A hole having an average diameter of about 3.5 feet and approximately 5 to 6 inches deep was filled with a mortar consisting of 50 parts by weight sand and 50 parts by weight of the alpha gypsum-portland cement-dispersant cement mixture specified in run 1 together with 35 weight percent water (based on the weight of the cement mixture). The mortar rapidly set, and the street was again opened to traffic within 25 minutes from pouring.

The repairs outlined in the above tests 1–4 were subjected to adverse weather conditions including rain, sleet and ice, and temperatures ranging from below freezing to above 100° F. over a period of about ten months. Additionally, during this ten-month period, several hundred motor vehicles per day passed over each of the repairs. After this ten-month period, the repairs were in excellent condition, and exhibited no unusual wear or deterioration either from the vehicular traffic or from the weather conditions.

EXAMPLE 13

Since conventional cement compositions require abnormally long times to set and cure in very cold weather, particularly below about 10° F., several tests were made to illustrate that the fast-setting cement compositions of this invention containing small portions of a mineral acid such as hydrochloric acid will set and cure within relatively short periods of time when subjected to extremely low temperatures. The tests were made with a cement combination consisting of 9.5 parts by weight of alpha gypsum ("Hydrostone"), 0.5 part by weight portland cement, and approximately 5% the dispersant described in Example 9 (based upon the weight of the dry cement) together with 50 parts by weight of very dilute hydrochloric acid solutions. As indicated in Table IX, the dilute acid was admixed with the chilled cement material to form a slurry which was placed into a cold chamber. After each sample had set in the cold chamber for one hour, a compressive strength test (ASTM C-39-61) was run thereon. The results are indicated in Table IX below.

TABLE IX.—COLD TESTS—HCl MIX LIQUID
[Cement blend with 50% liquid based on weight of dry material]

| Acid percent | Cold chamber temp., °F. | Dry cement material temp., °F. | Acid temp., °F. | Slurry temp., °F. | 1 hour compressive strength, p.s.i. |
|---|---|---|---|---|---|
| 2 | −15 | −10 | 42 | 37 | 225 |
| 3 | −15 | −10 | 42 | 46 | 372 |
| 4 | −15 | −10 | 42 | 52 | 866 |
| 3 | −10 | −5 | 76 | 72 | 1,120 |
| 4 | −10 | −5 | 76 | 78 | 1,072 |
| 5 | −10 | −5 | 76 | 82 | 1,000 |
| 2 | +5 | +6 | 56 | 54 | 800 |
| 3 | +5 | +6 | 50 | 57 | 1,280 |
| 4 | +5 | +6 | 40 | 58 | 1,200 |
| 5 | +5 | +6 | 40 | 68 | 1,340 |
| 2 | +10 | +6 | 50 | 49 | 281 |
| 3 | +10 | +6 | 50 | 52 | 1,480 |
| 4 | +10 | +6 | 50 | 61 | 1,780 |

It is preferred that the viscosity of the quick-setting cement of the present invention be maintained at below about 250 centipoises to facilitate pumping, and the limits of pumpability are at about 100 poises. For this reason, if the quick-setting cement is to be pumped it must be maintained at a value less than 100 poises.

Having described the invention in connection with certain specific embodiments thereof, it is to be understood that further modifications may now suggest themselves to those skilled in the art and it is intended to cover such modifications as fall within the scope of the appended claims.

What is claimed is:
1. A quick setting cement composition consisting essentially of a mixture of 9.5 to 4 parts by weight of alpha gypsum and 0.5 to 6 parts by weight of portland cement together with a minor effective portion of a dispersant.
2. The cement composition of claim 1 further comprising from 22 to 70% by weight water based on the quantity of said alpha gypsum and portland cement in said composition.
3. The cement composition of claim 2 consisting essentially of from 9.5 to 7 parts by weight of alpha gypsum and from 0.5 to 3 parts by weight of portland cement, and from 22 to 40% by weight water based on the quantity of said alpha gypsum and portland cement in said composition.
4. A mass of hardened material bound by the setting action of the composition of claim 2.
5. The cement composition of claim 1 containing 9.5 parts by weight of alpha gypsum and 0.5 part by weight of portland cement.
6. The cement composition of claim 1 wherein said dispersant is the sodium salt of sulfonated naphthalene formaldehyde.
7. The cement composition of claim 2 further comprising a minor effective proportion of an inorganic acid accelerator.
8. The cement composition of claim 7 wherein said acid is hydrochloric acid.

References Cited

UNITED STATES PATENTS

| | | | |
|---|---|---|---|
| 1,558,783 | 10/1925 | Bleecker | 94—24 |
| 1,705,088 | 3/1929 | Hipple | 94—24 |
| 3,179,528 | 4/1965 | Holmgren | 106—90 |
| 3,232,778 | 2/1966 | Dean | 106—89 |
| 2,798,003 | 7/1957 | Morgan et al. | 106—90 |
| 2,690,975 | 10/1954 | Scripture | 106—90 |
| 2,310,023 | 2/1943 | Gardner | 106—110 |
| 2,172,076 | 9/1939 | Wolf et al. | 106—111 |
| 1,923,370 | 8/1933 | Hansen | 106—89 |
| 1,901,056 | 3/1933 | Randel | 106—89 |
| 933,036 | 8/1909 | Headson | 106—97 |
| 581,466 | 4/1897 | Kleber | 106—110 |

OTHER REFERENCES

F. C. Welch Journal of the American Ceramic Society, vol. 6, No. 11, November 1923, pp. 1204–6.

JAMES E. POER, Primary Examiner

W. T. SCOTT, Assistant Examiner

U.S. Cl. X.R.

106—89, 97, 109, 110, 315, 287 soil stabilization